Patented Sept. 10, 1935

2,013,856

UNITED STATES PATENT OFFICE 2,013,856

ALKALI-METAL ZIRCONIUM TARTRATE AND METHOD OF PRODUCING SAME

Charles J. Kinzie, Niagara Falls, N. Y., assignor to The Titanium Alloy Manufacturing Company, New York, N. Y., a corporation of Maine No Drawing. Application July 13, 1932, Serial No. 622,316

8 Claims. (Cl. 260—11)

My invention relates generally to the derivation of zirconium compounds from the decomposition of zirconium ores and minerals, the most important of which are baddeleyite and zircon (zirconium silicate), which compounds result chiefly in the form of acid zirconium solutions that may be used in preparing various inorganic and organic salts of zirconium as required for uses in the various arts to which zirconium-containing products are adapted.

Such natural zirconium ores (baddeleyite and zircon) are also associated with other mineral substances or impurities such as iron, titanium etc., as are more fully described in my U. S. Letters Patent No. 1,658,807 dated February 14, 1928.

In my U. S. Patent No. 1,609,826 of December 7, 1926, I have disclosed how a solution of sodium zirconium tartrate may be prepared by treating sodium zirconium silicate with tartaric acid, drying such solution to render silicon compounds insoluble in water, and then extracting with water, followed by filtration to remove the insoluble silicon compounds from the solution containing the zirconium compounds.

Tartrate solutions prepared according to the methods set forth in my said patent are likely to crystallize when produced in strong solutions.

I have now discovered that if an alkali or alkaline compound, particularly ammonium hydroxide, be added to the tartrate solution to make it neutral, or preferably slightly alkaline, the resulting solution has novel properties quite different from the properties of the tartrate solution prepared according to the methods of my Patent No. 1,609,826, for example, such tartrate solution, after treating with ammonia, will no longer crystallize out as a salt upon evaporation, but may be evaporated to a transparent gum-like substance, which is readily and completely soluble in water.

This new alkali-metal zirconium tartrate product, as well as solutions thereof, have properties quite different from the tartrate product as described in my Patent No. 1,609,826.

Such novel product has properties that indicate its use as a glueing agent for paper; also as a bond for organic and inorganic solid fabrications; also as a dispersing or deflocculating agent, as well as a coating solution, whereas the crystallizable product of my patent does not possess these properties.

This novel alkali-metal zirconium tartrate product may be made according to the following methods.

Zirconium silicate (zircon) is milled to suitable fineness (325 mesh), and is then mixed intimately with a suitable alkali-metal compound, such as sodium carbonate, and heated at temperature such as will decompose the zircon, yielding a product readily soluble in dilute acids. Other alkali-metal compounds, such as sodium hydrate, sodium peroxide and sodium sulphide, or mixtures thereof, may be used.

The product of this reaction which is the same as that of my Patent 1,609,826 is preferably milled with water, in the following proportions.

Parts by weight

Dry roasted product (being sodium zirconium
  silicate) _____ 100
Water _____ 94

194

The milling is carried preferably to point where less than ½ of 1% remains on a 325 mesh sieve.

*Example A*

This alkali-metal zirconium silicate slurry has approximately the following percentage composition:

Per cent

Silicon (calculated as $SiO_2$) _____ 10.49
Zirconium (calculated as $ZrO_2$) _____ 20.65
Soda (calculated as $Na_2O$) _____ 14.06
Water (calculated as $H_2O$) _____ 54.80

100.00

The solution of this alkali-metal zirconium silicate slurry is then preferably effected in the following manner: The charge formed comprises the following ingredients, parts by weight, viz:

Parts

Tartaric acid ($H_2C_4H_4O_6$) _____ 63
Water _____ 270
Zirconium slurry of above composition_____ 100

Total _____ 433

Preferably I first dissolve the tartaric acid in the water at about 85–95° C., and then add the zirconium slurry, such charge in receiving vessel being stirred by any suitable means.

The charge is then heated at about 90° C. until all soluble material has dissolved. Approximately 95% of the zirconium and silicon along with the alkali-metal compounds will pass into solution.

Upon heating this solution it will after a few hours time set to a jelly due to gelling of silicon compounds. It is then dried to render silicon compounds insoluble, and leached with about 500 parts of water or a sufficient amount to dissolve the crystalline tartrate salt, leaving the silicon insoluble; then the dissolved zirconium salt is separated from the silicon compounds by any suitable means.

From this point on, several optional treatments within scope of my invention may be made.

(A—1) In this preferred optional method the solution formed in Example A is taken after removal of silicon compounds and before addition of ammonia; it is then brought to suitable concentration to allow of crystallization of the sodium zirconium tartrate, but leaving some liquor with the crystals. The crystals formed upon cooling are then separated from the mother liquor by any suitable means, and the salt thus obtained may be dried and then stored until required for conversion to my non-crystalline tartrate product.

In this optional treatment No. 1, the mother liquor may be further evaporated and crystallized for additional recovery of salt.

The dried crystalline salt of this optional procedure No. 1 had upon analysis substantially the following composition:

| | Per cent |
|---|---|
| Zirconium (calculated as $ZrO_2$) | 32.69 |
| Silicon (calculated as $SiO_2$) | 0.04 |
| Sodium (calculated as $Na_2O$) | 12.55 |
| Carbon (C) | 18.72 |
| Water ($H_2O$) | 36.09 |
| Iron (calculated as $Fe_2O_3$) | 0.01 |
| | 100.10 |

It will be observed that by this procedure No. 1 a very pure product is obtained with no titanium present and for some purposes this will prove advantageous, as I have found that zirconium and titanium are difficultly separated by chemical means, particularly the last traces of titanium.

For instance, if the user wanted to have the tartrate product on hand in form available for miscellaneous uses, the crystal tartrate product would serve as a ready source of zirconium in water soluble form, and may also prove useful in this form in various applications in which adhesive properties are not desired. When, however, the user desires some of the tartrate adhesive, a sufficient quantity of the crystals are wetted and by my invention of adding alkali or alkaline compound, such as ammonia to same, the crystalline tartrate is quickly converted to adhesive substance. I thus make available in one product the tartrate product of method as disclosed in my U. S. Patent No. 1,609,826, and additionally the product as disclosed in this case.

(A—2) A suitable alkali or alkaline compound, preferably ammonium hydroxide ($NH_4OH$), is added to make the solution made according to Example A slightly alkaline which is then evaporated to syrupy consistency. No precipitation occurs in this neutral or slightly alkaline zirconium tartrate solution, and the resulting product at this point when cold is a clear solution and has specific gravity of about 1.40 and refractive index of approximately 1.49. The addition of ammonia probably acts merely as solvent that prevents the salt from crystallizing.

A chemical analysis showed this solution to be substantially of the following composition:

| | Per cent |
|---|---|
| Silicon (calculated as $SiO_2$) | Trace |
| Zirconium (calculated as $ZrO_2$) | 9.10 |
| Titanium (calculated as $TiO_2$) | 0.02 |
| Iron (calculated as $Fe_2O_3$) | 0.01 |
| Carbon (C) | 9.71 |
| Sodium (calculated as $Na_2O$) | 7.07 |
| Water and including ammonium compounds | 74.09 |
| | 100.00 |

The above concentration represents composition and concentration of my new tartrate compound which appears to be of proper consistency for use as a bonding agent and for coatings in general; also for making paper adhesive; also as vehicles in making water soluble paint coatings, and as dispersing agents.

(A—3) For some purposes, it may be important to eliminate enough of the water content to have product in the form of a solid. This result is accomplished by suitable drying equipment, and the product which I have made by drying at 110° C. has the following composition.

| | Per cent |
|---|---|
| Zirconium (calculated as $ZrO_2$) | 20.04 |
| Titanium (calculated as $TiO_2$) | 00.04 |
| Iron (calculated as $Fe_2O_3$) | 00.02 |
| Sodium (calculated as $Na_2O$) | 15.56 |
| Carbon (C) | 21.37 |
| Water and ammonium compounds | 42.97 |
| | 100.00 |

The product thus obtained and of above composition is an essentially clear, transparent gum-like material, completely soluble in water to yield solutions of any desired concentration from a very thick sticky solution to thinner ones, as required.

(A—4) The solution produced according to Example A after removal of silicon compounds but before the ammonia is added, may be dried to obtain a salt which can be kept in suitable packages until it is desired for use. Then a solution of my product may be obtained by simply wetting with water to produce a thick batch (in which the crystals are mainly insoluble and existing still as crystals), which batch is treated with strong ammonia, in amount sufficient to make ultimate charge slightly alkaline. Upon the addition of ammonia a remarkable change takes place, the crystals rapidly disappear, and a product is obtained of same relative composition as analysis given in optional treatment No. 2 and of the same general properties. This solution may of course be evaporated to the gum-like product of No. 3, or by limiting the amount of water used to wet crystals and by making a very stiff paste and treating with $NH_3$ gas (anhydrous ammonia), the gum-like tartrate product might be directly produced with little or no incidental evaporation of water.

The dried crystalline sodium zirconium tartrate salt as produced according to optional procedure No. 4 had, upon analysis, the following composition:

| | Per cent |
|---|---|
| Zirconium (calculated as $ZrO_2$) | 20.37 |
| Silicon (calculated as $SiO_2$) | 0.18 |
| Sodium (calculated as $Na_2O$) | 19.26 |
| Titanium (calculated as $TiO_2$) | 0.05 |
| Carbon (C) | 22.18 |
| Iron (calculated as $Fe_2O_3$) | 0.02 |
| Water ($H_2O$) | 37.94 |
| | 100.00 |

*Example B*

In dissolving the alkali-metal zirconium silicate in tartaric acid, I prefer to use a solution sufficiently dilute so that the solution may be effected before silicon separates; in this way it is easier to determine when solution of the soluble material has been completed.

I have, however, used the following procedure in which the charge formed comprises the following ingredients, parts by weight, viz:

| | Parts |
|---|---|
| Sodium zirconium silicate slurry of composition previously given in Example A | 100 |
| Tartaric acid | 63 |
| Water | 63 |
| | 226 |

The tartaric acid is first dissolved in water at about 85-95° C. and the aforesaid slurry is added. In a few minutes after addition of slurry is finished, the silicon separated and gelled. The charge was then dried etc., and the zirconium alkali-metal tartrate salt dissolved in water and separated from the now insoluble silicon compound. The tartaric acid may also be added to the alkali-metal zirconium silicate slurry, and in fact the process could be operated by a number of variations which are unimportant, as long as the final result as described is produced.

Example C

In the foregoing Examples A and B, I have dealt with the treatment of sodium zirconium silicate suspensions in water, no attempt having been made to remove the small amount of water dissolved soda salts along with small amount of sodium silicate and sodium aluminate and traces of other impurities such as chromium, etc.

In case the zirconium ore was a less pure material than I have treated in the foregoing examples, it might be advantageous to extract the water dissolved material before proceeding with the treatment with tartaric acid.

In the following example, I will describe a case in which the water soluble material is washed out of the sodium zirconium silicate slurry, and the residual sodium zirconium silicate is dried, and in the form of dry powder is then added to the tartaric acid.

The dry sodium zirconium silicate obtained as by washing and drying etc., has upon analysis the following composition:

| | Per cent |
|---|---|
| Zirconium (calculated as $ZrO_2$) | 52.42 |
| Silicon (calculated as $SiO_2$) | 25.08 |
| Sodium (calculated as $Na_2O$) | 21.75 |
| | 99.25 |

Using above dry product, the tartrate solution is prepared in the following manner:

64.25 parts by weight of tartaric acid is dissolved in 320 c. c. water parts by weight by heating to about 90° C.

50 grams parts by weight dry sodium zirconium silicate of the composition given in above is added to the stirring solution and digested at about 90° C. until solution of the solids was essentially complete, and there remained but a small amount of undissolved matter. This charge was evaporated to a dry mass at about 90° C. and then leached with water to remove the tartrate salt from the insoluble siliceous matter and filtered. The filter cake was dried and calcined and weighed 14.8 grams, approximately 12.5 grams of which was silica the remainder being mainly $ZrSiO_4$. This shows a conversion of approximately 92% of the zirconium to the desired soluble tartrate compound.

If ammonium hydroxide ($NH_4OH$) is now added to this solution, a non-crystalline water soluble gum-like product is obtained upon evaporation containing either in solution or in solid the following approximate ratios:—

0.88 parts carbon to one part $ZrO_2$
0.47 parts $Na_2O$ to one part $ZrO_2$

Example D

I have also prepared a non-crystalline gum-like tartrate product consisting of potassium zirconium tartrate, neutralized with $NH_4OH$. The following example will illustrate this method.

Potassium zirconium silicate of following composition was used

| | Per cent |
|---|---|
| Zirconium (calculated as $ZrO_2$) | 43.21 |
| Silicon (calculated as $SiO_2$) | 24.32 |
| Potassium (calculated as $K_2O$) | 31.05 |
| | 98.58 |

This product was wet milled with water to yield a slurry containing 50% zirconium alkali-metal silicate and 50% $H_2O$ and all fine enough to pass a 325 mesh sieve.

82 parts by weight tartaric acid was then dissolved in 410 parts by weight water by heating to about 95° C. 77 parts by weight of this potassium zirconium slurry was added and the charge digested 1 hour at 95° C.

The resulting charge was then evaporated and dried at about 90° C. and then leached with 500 parts by weight of water (hot) to dissolve the zirconium salt. The silicon was then removed by filtration, the filtrate containing potassium zirconium tartrate may then be cooled and the crystalline zirconium tartrate salt of potassium crystallized out and removed from the mother liquor thereby obtaining a relatively pure potassium zirconium tartrate.

The solution can be evaporated and dried to yield a less pure water soluble potassium zirconium tartrate salt.

Either of the above salts or the solution from which these were obtained can be neutralized with alkali, preferably $NH_4OH$, to form according to my process a zirconium potassium tartate compound non-crystalline in properties and which may be used in much the same manner as the products of sodium salt Examples A, B and C. The products set forth in the chemical analysis in Examples A, B and C have all their carbon present combined in the tartrate radical in the tartrate compounds produced.

These compounds, referring chiefly to sodium zirconium tartrate, upon heating form sodium zirconate, passing through stages such as charring of organic matter and oxidation of same, but through the process of heating retain bonding properties with the ultimate product serving as an effective bonding agent, either by virtue of its own properties, or when it combines by heat with the material bonded.

I claim as my invention:—

1. The method of producing an alkali-metal zirconium tartrate free from titanium and iron, which comprises heating natural zirconium ores associated with impurities such as iron and titanium mixed with a strongly alkaline alkali-metal compound to substantial decomposition to form an acid soluble alkali-metal zirconium silicate, heating a slurry of said silicate and tartaric acid to bring the zirconium, silicon, and alkali-metal compounds into solution and drying same to render the silicon compounds insoluble, leaching the dried mass with water to dissolve the alkali-metal zirconium tartrate while leaving the residual insoluble silicon compounds and removing the latter from the solution, concentrating said resulting solution to obtain alkali-metal zirconium tartrate crystals and separating same from the mother liquor to leave the iron and titanium and other impurities in solution to form an alkali-metal zirconium tartrate free from titanium and iron, then leaching said tartrate crystals to form a solution thereof, adding ammonium hydroxide to said tartrate solution to render same neutral or slightly alkaline without causing any precipitation therein, and concentrating same to produce a non-crystalline, readily water-soluble alkali-metal zirconium tartrate substantially free from titanium and iron.

2. In the method of producing a sodium zirconium tartrate free from titanium and iron from an acid soluble alkali zirconium silicate, the steps which consist in heating a slurry of said acid soluble alkali zirconium silicate mixed with tartaric acid to obtain a tartrate along with the zirconium and silicon compounds in solution, drying same to render the silicon compounds insoluble, leaching the dried mass with water to dissolve the sodium zirconium tartrate while removing the insoluble silicon compounds from the solution, concentrating the said resulting solution to obtain sodium zirconium tartrate crystals and separating same from the mother liquor to leave the iron and titanium in solution, then leaching said tartrate crystals to form a solution thereof, adding ammonium hydroxide to said tartrate solution to render same neutral or slightly alkaline without causing any precipitation therein, and finally concentrating the resulting solution to produce a non-crystalline, readily water-soluble sodium zirconium tartrate substantially free from titanium and iron.

3. In the method of producing an alkali-metal zirconium tartrate free from titanium and iron from an acid soluble alkali zirconium silicate, the steps which consist in heating a slurry of said acid soluble alkali zirconium silicate mixed with tartaric acid to obtain a tartrate along with the zirconium and silicon compounds in solution, drying same to render the silicon compounds insoluble, leaching the dried mass with water to dissolve the alkali-metal zirconium tartrate while removing the insoluble silicon compounds from the solution, concentrating the said resulting solution to obtain alkali-metal zirconium tartrate crystals and separating same from the mother liquor to leave the iron and titanium in solution, then wetting said tartrate crystals to form a stiff paste, and treating said paste with aqueous ammonia to produce a non-crystalline, readily water-soluble alkali-metal zirconium tartrate substantially free from titanium and iron.

4. In the method of producing a sodium zirconium tartrate free from titanium and iron from an acid soluble alkali zirconium silicate, the steps which consist in heating a slurry of said acid soluble alkali zirconium silicate mixed with tartaric acid to obtain a tartrate along with the zirconium and silicon compounds in solution, drying same to render the silicon compounds insoluble, leaching the dried mass with water to dissolve the sodium zirconium tartrate while removing the insoluble silicon compounds from the solution, concentrating the said resulting solution to obtain sodium zirconium tartrate crystals and separating same from the mother liquor to leave the iron and titanium in solution, then wetting said tartrate crystals to form a stiff paste, and treating said paste with aqueous ammonia to produce a non-crystalline, readily water-soluble sodium zirconium tartrate substantially free from titanium and iron.

5. An alkali-metal zirconium ammonium tartrate composite characterized as being essentially a clear concentrated viscous aqueous substantially neutral solution complex of alkali-metal zirconium ammonium tartrate having a specific gravity of about 1.40 and containing less than 0.05% each of titanium oxide and ferric oxide.

6. A sodium zirconium ammonium tartrate composite characterized as being essentially a clear concentrated viscous aqueous substantially neutral solution complex of sodium zirconium ammonium tartrate having a specific gravity of about 1.40 and containing less than 0.05% each of titanium oxide and ferric oxide.

7. An alkali-metal zirconium ammonium tartrate product characterized as being a non-crystalline, transparent, readily water-soluble material consisting of an aqueous complex of alkali-metal zirconium ammonium tartrate and containing less than 0.05% each of titanium oxide and ferric oxide.

8. A sodium zirconium ammonium tartrate product characterized as being a non-crystalline, transparent, readily water-soluble material consisting of an aqueous complex of sodium zirconium ammonium tartrate and containing less than 0.05% each of titanium oxide and ferric oxide.

CHARLES J. KINZIE.